(No Model.)
W. HENDERSON.
METALLIC BAR FOR WINDOW SASHES, &c.
No. 497,543. Patented May 16, 1893.
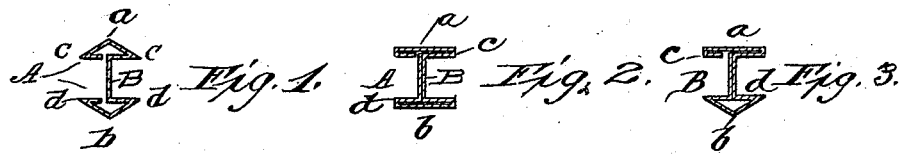
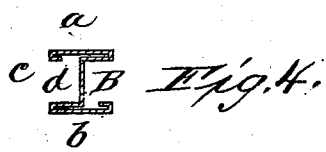
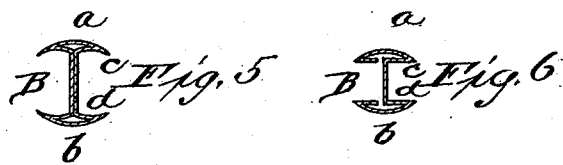
Witnesses
Chas. E. Gorton
Ruth G. Gorton
Inventor
Wm Henderson
By his Attorney
Chas. C. Gillman

UNITED STATES PATENT OFFICE.

WILLIAM HENDERSON, OF CHICAGO, ILLINOIS.

METALLIC BAR FOR WINDOW-SASHES, &c.

SPECIFICATION forming part of Letters Patent No. 497,543, dated May 16, 1893.

Application filed March 2, 1891. Serial No. 383,477. (No model.)

*To all whom it may concern:*

Be it known that I, WILLIAM HENDERSON, a subject of the Queen of Great Britain, residing at Chicago, in the county of Cook and State of Illinois, have invented certain new and useful Improvements in Metallic Glazing Bars or Cames, of which the following is a specification.

My invention relates to improvements in metallic glazing bars or cames for ornamental or stained glass windows, and consists in certain peculiarities of the construction and the form thereof, as will be hereinafter more fully set forth and specifically claimed.

Prior to my inventions (so far as I am aware) the common means employed by glaziers for setting ornamental or art glass were lead cames which could be readily worked or made to conform to the glass. These lead cames, however, are so weak, owing to the character of the metal employed, that they furnish insufficient support to the glass, and resort must be had to strengthening bars or rods connected at their ends to the sides of the sash frame and intermediately to the cames. It was also common, in the manufacture of sky lights and similar structures, to employ sheet metal bars consisting of a base and a cap piece to hold the glass, the latter being placed upon the base and the cap piece afterward applied, and in some instances the glass was slipped in from the ends of the bars. These bars were of considerable size to adapt them to sustain large and heavy pieces of glass, and as they were placed in an elevated position their appearance was a matter of small importance and were used only for straight lined glass. On account of their size they were entirely unfit for use in stained or cut glass work, as it was impossible for them to be bent by rolls or fingers to the glass and to be worked to, and built up with the same, which is the essential feature of my invention.

In my patent, No. 420,510, I have described a sheet metal sash bar, composed of a base and cap piece, for use with ornamental or art glass. In this construction a frame was first built up out of the base pieces and the glass put in and then the caps afterward applied. This was an improvement upon any methods theretofore existing, as the sheet metal bars, while small and therefore not unsightly, furnished the proper lateral support for the glass and rendered unnecessary the use of the strengthening bars or rods. But the method of this patent is slow. I have discovered that by making these bars or cames from a hard sheet metal doubled to form marginal heads and connected by a web of less width than the heads, in order to provide a seat to receive the edges of the glass, such bars can be bent laterally so as to be built up or worked with the glass in the same manner as the lead cames have previously been worked.

Another advantage of my invention is that I am enabled to use a lighter or more delicate bar and yet obtain the desired strength or rigidity in the structure; and also enables me to work the bar to a much smaller piece of glass or design. At present the requirements of the public taste demands glazing in which the glass forms the prominent part of the work while the bars are desired to be inconspicuous as possible.

My invention therefore consists in a hard sheet metal bar or came for ornamental glazing having marginal heads formed by doubling the metal upon itself with a seat or recess between said heads to receive and hold the edges of the glass, the doubled heads furnishing sufficient strength to the bar or came to permit it to be bent laterally and fitted to the edge of the glass without puckering, crimping or disfiguring the metal, and thus enabling the bar or came to be worked or fitted to the glass and built up therewith.

In order to enable others skilled in the art to which my invention pertains to make and use the same, I will now proceed to describe it, referring to the accompanying drawings, in which—

Figure 1 represents an end or sectional view of one form of my bars, and the remaining six figures illustrate similar views of modifications thereof.

Similar letters refer to corresponding parts throughout the different views of the drawings.

A, represents the entire bar which is made of hard sheet metal, and is formed as shown with rib B, connecting the upper and lower portions $a$, $b$, of the bar which form shoulders, $c$, $d$, between which the edge of the sheet of glass is held. Both the upper portion $a$, and lower portion $b$, may be formed hollow as shown in Figs. 1, and 6, and the lower portion may be made hollow and the upper portion compressed as shown in Fig. 3, or vice versa; or both upper and lower portions may be compressed as illustrated in Figs. 2 and 4.

By reference to the various figures of the drawings, it will be seen and readily understood that the essential feature of my invention is to so form the upper and lower portions of the bar, that in the lateral bending thereof to adapt them to the various curves and shapes of the glass which they are to receive and retain they will not kink, crinkle or pucker, but will present a smooth face or outer surface. I attain this object or result by forming the said portions of the box double or bent back upon itself; that is, I take a piece of sheet metal of the proper dimensions and form it into a strip or bar A, of any desired length, having upper and lower parts $a$, $b$, united together by a rib B, the parts $a$, $b$, forming shoulders $c$, $d$, on the rib with a space between each, of sufficient size to readily admit the sheet of glass. The entire bar may be made of one or more pieces of metal.

I may form the bar into any of the shapes illustrated, and perhaps others, but those shown are sufficient to demonstrate my invention. It will be seen in each of the Figs. 1. to 6. inclusive, that the top and lower portions of the bar are formed double or partially so, or are entirely or partially bent back upon themselves, while the rib B, may or may not be so constructed. It is therefore evident that when the bar is thus made of one piece of metal with the upper and lower portions made double the juncture of the edges of the metal may be at any point, and also that where the upper and lower parts are double or bent back upon themselves and the rib is single as shown in Figs. 1, 4 and 6. that the parts $a$, and $b$, may be either partially or wholly double as illustrated. It is also apparent that one or both of the upper and lower parts may be concavo-convex as shown in Fig. 5. or convex as shown in Fig. 6. and that the rib B, may be either single or double as desired.

It will be seen by reference to the drawings that the bar in each view, is constructed without a seam on its outer surface, and will thereby present a more attractive appearance when placed in position in the sash.

Having thus fully described my invention, what I claim as new, and desire to secure by Letters Patent, is—

1. A bar or came, made of one piece of metal and consisting of the hollow marginal doubled heads $a$, and $b$, without seams on their outer surfaces, the rib B, connecting the heads and the ledges $c$ and $d$ on each side of said rib and substantially at right angles therewith.

2. A bar or came, made of one piece of metal and consisting of the marginal doubled heads $a$ and $b$, without seams on their outer surfaces, the rib B connecting the heads, and the ledges $c$ and $d$ on each side of said rib and substantially at right angles therewith.

WILLIAM HENDERSON.

Witnesses:
  CHAS. C. TILLMAN,
  DIXIE DOYLE.